United States Patent [19]
Weigand

[11] Patent Number: 4,842,249
[45] Date of Patent: Jun. 27, 1989

[54] SPREADER TYPE RESCUE TOOL

[76] Inventor: George R. Weigand, 4409 Fender Rd., Lisle, Ill. 60532

[21] Appl. No.: 533,259

[22] Filed: Sep. 16, 1983

[51] Int. Cl.$^4$ ............................................. B66F 3/24
[52] U.S. Cl. .................................... 254/93 R; 72/392
[58] Field of Search ............... 254/93 R; 72/392, 705; 403/378, 379; 81/423, 186, 900

[56] References Cited

U.S. PATENT DOCUMENTS

| | | | |
|---|---|---|---|
| 1,412,610 | 4/1922 | Foley | 403/379 |
| 3,819,153 | 6/1974 | Hurst et al. | 254/93 R |
| 3,967,399 | 7/1976 | Heinold et al. | 403/379 X |
| 4,333,330 | 6/1982 | Porter | 72/392 |
| 4,462,638 | 7/1984 | Den Besten | 403/378 X |

FOREIGN PATENT DOCUMENTS 2621249  11/1977  Fed. Rep. of Germany ........ 72/392

OTHER PUBLICATIONS

"Rescue Gator", 99850 Deluxe System, Catalog RG-8100, Walker Manufacturing, Jan. 1981.
"Hurst Hydraulic Tools", Hurst Performance Inc., Jan. 1983.

Primary Examiner—Frederick R. Schmidt
Assistant Examiner—Judy J. Hartman

[57] ABSTRACT

A light weight portable spreader type rescue tool for applying high push/pull forces comprising a pair of power-driven, light weight aluminum alloy force arms pivotally mounted on a body for swinging movement toward and away from one another. A hardened steel jaw tip member extends forwardly from each arm. The forward end of the arm has an I-cross-section with a central web and a pair of transverse flanges defining a pair of substantiallly rectangular cross-section sockets. The tip member has a main body portion and a shank comprising a pair of transversely spaced rearwardly extending tongues formed to fit snugly within the sockets in the arm. An annular cross-section hardened steel sleeve and a circular cross-section hardened steel pin are spaced apart along the shank and forcibly press-fitted through transverse, aligned, bored holes in the arm web and the jaw tip member shank tongues respectively. In addition, an auxiliary hardened steel strengthening pin is press-fitted into the sleeve. A plurality of concentric, cylindrical slip planes result from this pin and sleeve arrangement enabling controlled elastic deflection of the contacting aluminum and steel surfaces, within their respective yield points. Slippage along these planes may be enhanced by use of a lubricant such as powdered molybdenum disulfide during the press-fitting operation. An improved clevis with a permanently attached clevis pin is provided for use with the rescue tool.

4 Claims, 3 Drawing Sheets

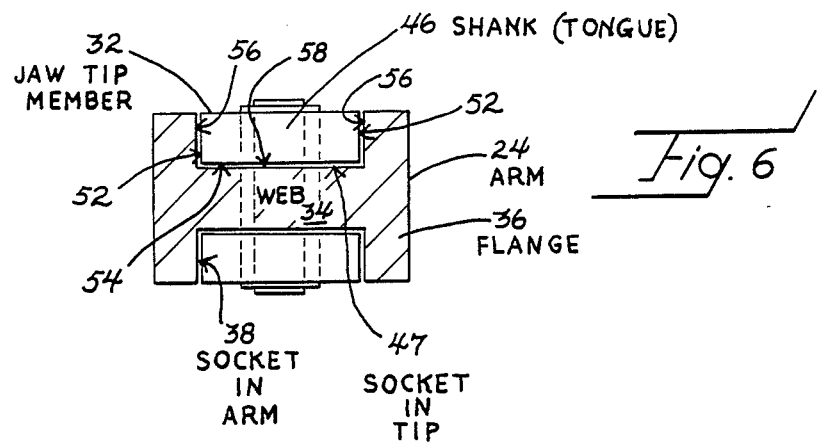
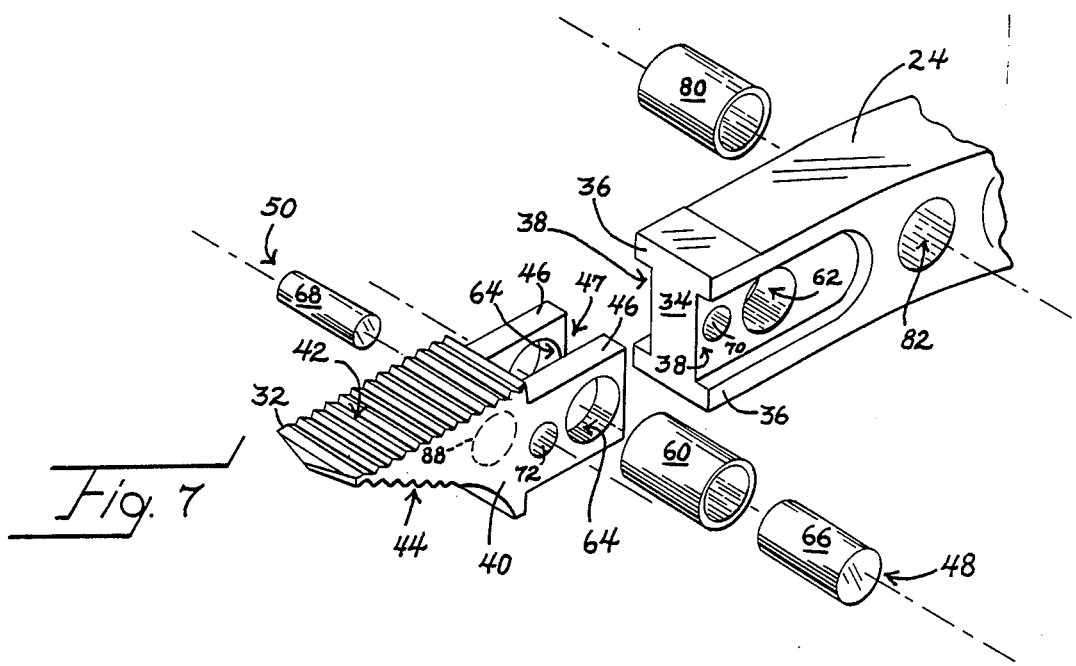
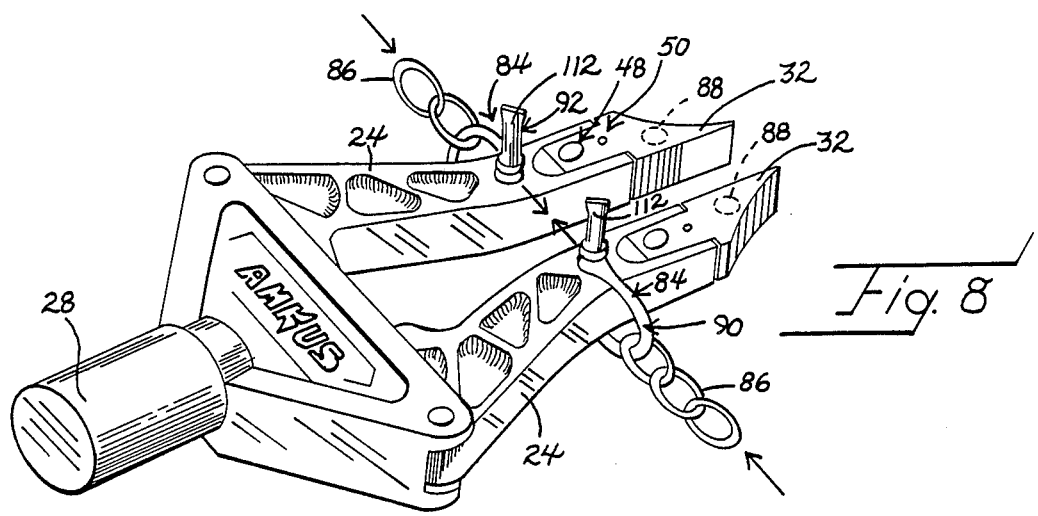

SPREADER TYPE RESCUE TOOL

BACKGROUND OF THE INVENTION

The present invention relates to a new, portable spreader-type rescue tool for applying high push/pull forces in moving, bending or opening up a wrecked vehicle to free a person trapped in it.

This general type of tool is shown and described in U.S. Pat. No. 3,819,153 issued June 25, 1974 on "Rescue Tool" to which reference may be had for a more detailed description of specific uses of it.

This is one of a number of specialized tools carried by paramedics, firemen and others for freeing accident victims. It must be portable, light enough for one person to carry, and capable of exerting extremely high push-/pull forces, enough for example to rip a door completely off a vehicle along the hinged edge, or to pull a steering column forward through the windshield opening.

These spreading tools have a pair of pivoted arms with powerful hydraulic drive mechanism for forcing them together or apart. They have narrow tips which can be forced into small openings such as between a door and frame and must be capable of exerting pushing and pulling forces of 20,000 pounds or more.

Attempts have been made to lighten the weight of these tools by using aluminum alloy arms, with hardened steel jaw tips. Prior to the present invention, attempts to obtain push/pull forces of this magnitude in a tool light enough to be readily portable have resulted in breakage of the aluminum arms or loosening of the tips after a few operations.

Where the tool is used in a pull mode, as for tensioning chain sections attached between a front bumper and a steering wheel pinned agaist an accident victim, clevises are used to connect chain sections between the respective tool arms and the bumper and steering column. Conventional clevises have had a number of drawbacks, including loose clevis pins which may become lost in the confusion of an accident scene.

Previous attempts to reduce the weight of these rescue tools by mounting the spreading tips in aluminum alloy arms have not been completely satisfactory.

SUMMARY OF THE INVENTION

It is a general object of the present invention to provide such a spreader-type rescue tool capable of applying the powerful push/pull forces required, yet which is light in weight through an effective combination of aluminum alloy arms and hardened steel jaw tips.

An important feature of the invention is an improved connection between the aluminum arms and the steel tips which prevent tip loosening or arm breakage over extended periods of use.

Another object of this invention is to provide an improved clevis for using the tool in the pull mode.

BRIEF DESCRIPTION OF THE DRAWINGS

Other objects and advantages will be apparent from the following description taken in connection with the drawings in which:

FIG. 6 is a vertical sectional view of FIG. 2 taken along line 6—6;

FIG. 7 is a fragmentary, enlarged perspective exploded view of one of the force arm and jaw tip assemblies shown in FIG. 2;

FIG. 8 is a view similar to FIG. 1 showing the improved clevises attached to place the tool in pull mode;

Like parts are referred to by like reference characters.

DESCRIPTION OF THE PREFERRED EMBODIMENT

Figure 1:
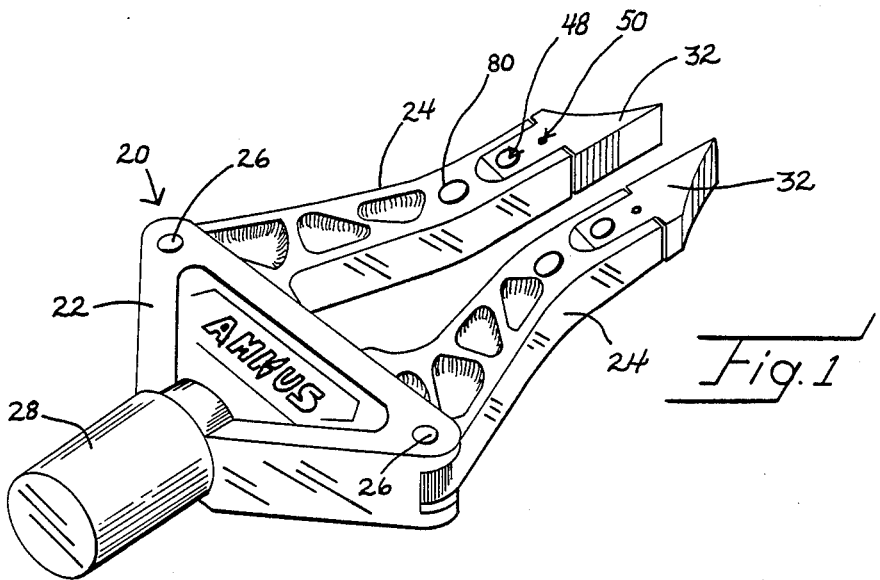
FIG. 1 is a perspective view of a spreader-type rescue tool incorporating the present invention.
Figure 3:
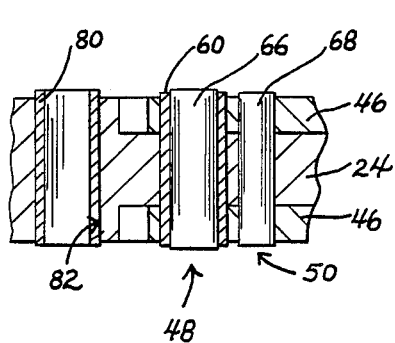
FIG. 3 is a fragmentary sectional view of FIG. 2 taken along line 3—3.

Referring now to the specific embodiment of the invention in the drawings, a portable spreader-type rescue tool is generally designated 20 in FIG. 1. It has a body or bracket 22 and a pair of force arms 24, 24. Each arm has a pivotal journal opening 25 (FIG. 2) engaging a pivot pin 26 mounted in the corresponding side of the body 22. A hydraulic cylinder 28 supplies power through a piston (not shown) and a rack (not shown) engaging pinion teeth 30 on each of the arms 24. The specific hydraulic drive means forms no part of the present invention so will not be described in detail here. Suffice it to say however that the cylinder means 28 is double acting, and when it is pressurized to move the above-mentioned rack (not shown) backwardly or forwardly, the arms 24, 24 move toward or away from one another respectively. Typically, in the present tool, forwardly directed hydraulic pressure of 10,000 psi in the cylinder 28 results in oppositely directed spreading forces of 20,000 pounds at the forward ends of the tips 32, 32.

Referring now in more detail to the improved connection between the hardened steel jaw tips 32 and the aluminum alloy arms 24, the outer end of each arm as best shown in FIG. 7 has an I-cross-section, with a web 34 and a pair of transverse flanges 36, 36 defining rectangular cross-section sockets 38, 38 on opposite sides of the web.

The jaw tip member 32 has a main body portion 40 with opposite toothed, work-engaging surfaces 42 and 44, and a rearwardly extending shank comprising tongues 46, 46 which fit snugly within the above-described arm sockets 38, 38 respectively.

An important part of the invention providing a positive connection between the jaw tip members 32 and the arms 24 comprises a first connection 48 and a second connection 50 together with snug fits between shank/-arm surfaces 52/56, 52/56, and 54/58.

The first connection 48 comprises a hardened steel sleeve 60 pressed through aligned, bored holes 62 and 64, 64 in the arm and tip respectively, and a hardened steel pin 66 pressed into the sleeve. These parts have interference fits in the order of 0.001" per inch requiring forces in the neighborhood of 30-35 tons to assemble them, and the use of gall-resistant lubricant such as dry molybdenum disulfide powder facilitates the assembly.

The second connection 50 is a hardened steel pin 68 similarly lubricated and pressed into aligned bored holes 70 and 72 in the arm and tip.

For all practical purposes, the connections 48 and 50 are permanent, although they may be removed by a powerful press to reverse the press assembly operations described.

The pin and sleeve combination in the first connection 48 is a most important feature of the present invention. While it is not known exactly how it protects the arm from breakage under maximum load conditions, it is a fact verified by numerous and exhaustive tests that it does.

Figure 2:
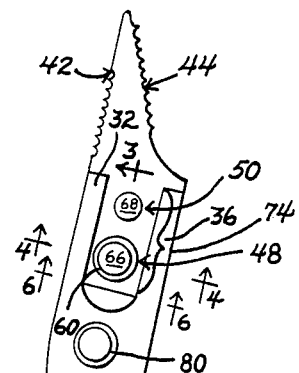
FIG. 2 is an enlarged top view of one of the pivotal arm and jaw tip subassemblies shown in FIG. 1.

The presence of the pin 66 as a supplemental reinforcing element inside the sleeve 60 contributes significantly to the strength of the connection. Tests have shown that where the second conection 50 (comprising the single pin 68) is employed, without the first connection 48, failure will occur under severe working conditions producing up to about 20,000 pounds of spreading force. Specifically, one of the flanges 36 of the aluminum arm will break off adjacent the tip member along line 74 as shown in FIG. 2. Further, using the pin 68 and the sleeve 60 without the internal pin 66, the arm 24 will still break. However, with the full combination of the first and second connections including the pin 68, the sleeve 60 and the supplemental reinforcing pin 66 inside the sleeve, no breakage occurs even after many repeated maximum spreading force tests equivalent to the normal working life of the tool.

Figure 4:
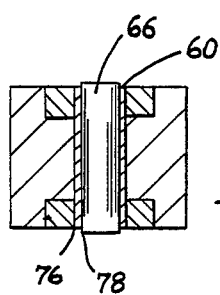
FIG. 4 is a transverse cross-section of FIG. 2 taken along line 4—4.

As stated, it is not known exactly how the pin and sleeve connection 48 protects the arm from failure under these maximum load conditions. As one possibility, it is believed that this provides a beneficial circular laminated structure in which a plurality of cylindrical slippage planes 76 and 78 (FIG. 4) enable the parts to deflect within the yield points of the aluminum alloy and hardened steel materials when maximum load is applied as illustrated in somewhat exaggerated form in FIG. 5.

Figure 5:
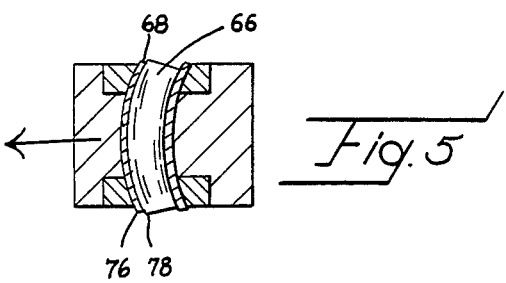
FIG. 5 is a view similar to FIG. 4 showing in somewhat exaggerated form deflections of the various aluminum and steel components under extreme force conditions.

The deflection under a given load of high strength aluminum alloy is in the order of three times that of steel so if the deflections of the steel sleeve 60 and pin 66 are kept within their elastic limits, the deflection of the surrounding aluminum must necessarily be within its elastic limit and no permanent deformation or loosening of the aluminum around the outside of the sleeve can occur. The deflection shown in FIG. 5 is exaggerated for purposes of illustration but will elastically return to the non-deflected condition shown in FIG. 4 when the load is removed. Slippage along the cylindrical slippage planes 76 and 78 is believed to be made more effective by residual amounts of any lubricating composition used in the assembly pressing operation.

The first connection 48 is preferably at the rear of the shank 46 because this is the area of maximum loading of the flanges 36 if the jaw tip twists about the pin 66 by transverse spreading loads on the outer, toothed surface 44. If desired however the positions of the first and second connections 48 and 50 may be reversed with some slight reduction in strength to be expected.

Another hardened steel sleeve 80 which may be identical or similar to sleeve 60 will preferably be press fitted into a bore 82 located in a solid portion of the arm 24 behind the jaw tip member. This provides a solid mounting for the pin of a clevis 84 when the tool is in a pulling mode between chain sections 86 as shown in FIG. 8. Alternatively, as shown by the broken line circle 88 in FIGS. 7 and 8 the hole for the clevis may be located in the body portion of the jaw tip member itself. One advantage of this would be to increase the effective stroke of the force arms although with some dimunition of force on the chain sections 86.

Figure 9:
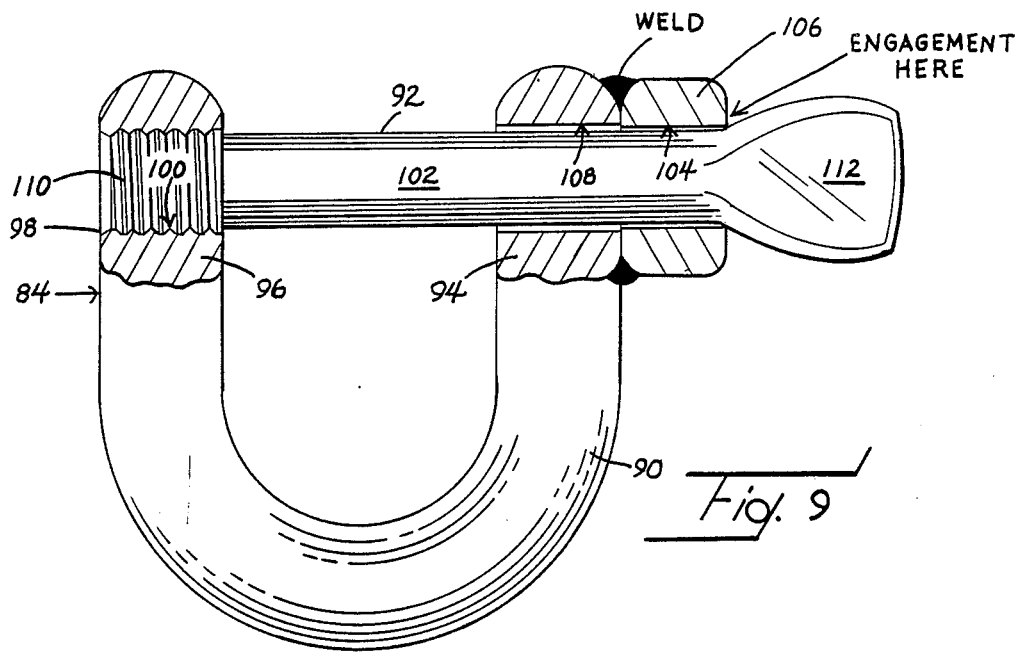
FIG. 9 is an enlarged, partially sectioned view of a clevis in closed position.
Figure 10:
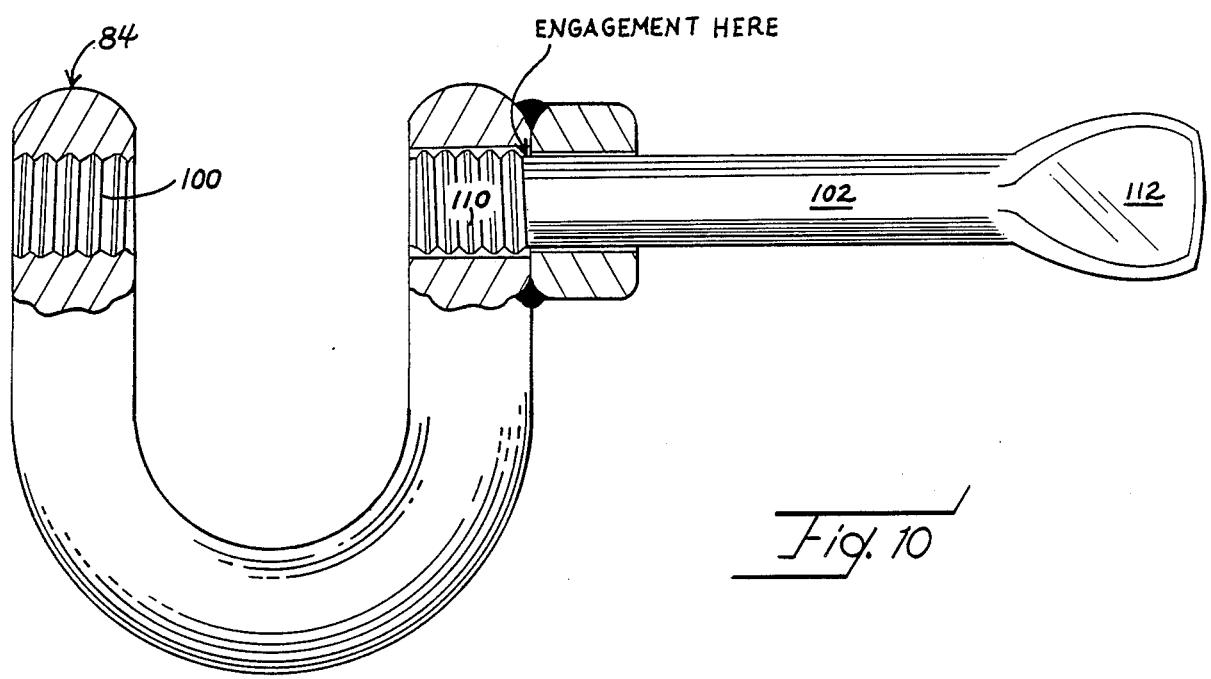
FIG. 10 is a view of the clevis in open position.

The improved clevis 84 is best shown in FIGS. 9 and 10. The clevis is quickly connectable to and disconnectable from the sleeve 80 in arm 24 (or alternatively in the hole 88 in the tip). An example when this pulling mode is called for is when an accident victim is pinned beneath a deformed steering column, in which case the opposite chain sections 86, 86 will be connected respectively between the front bumper and the steering column. Actuation of the tool then pulls the steering column forward freeing the person under it.

The clevis 84 comprises a C-shaped body 90 with a clevis pin 92 permanently slidably mounted in one arm 94. The other arm 96 has an aperture 98 with an internal thread 100.

The clevis pin has an intermediate portion 102 of a predetermined diameter which is slidably engaged within a bore 104 in an annular member 106 welded to and forming an integral part of arm 94. The forward end of the pin has external threads 110 which are engageable with internal threads 100 as shown in FIG. 9. The outer tips of threads 110 are somewhat larger in diameter than the bore 104, thus provide an effective stop preventing loss of the pin in the open position as shown in FIG. 10. A counter bore 108 in arm 94 is sufficiently large and sufficiently long axially to provide a pocket or recess for storing the external threaded portion 110 as shown in FIG. 10.

At the opposite end of the pin there is an outer, flattened, flared handle portion which is somewhat larger in diameter than the bore 104 thereby acting as an additional stop preventing further inward displacement of the pin from the position shown in FIG. 9.

Thus, the clevis pin 92 is limited in both directions by the threaded portion 110 and the handle portion 112 making it impossible for it to be lost in the confusion of an accident situation.

The embodiment described and shown to illustrate the present invention has been necessarily specific for purposes of illustration. Alterations, extensions and modifications would be apparent to those skilled in the art.

The embodiments of the invention in which an exclusive property or privilege is claimed are defined as follows:

1. In a portable spreader type rescue tool for applying push pull force, said tool having a body, a pair of forced arms pivotably mounted on fulcrum means in said body, power means for swinging said arms toward and away from one another, and a hardened jaw tip member extending forwardly from each arm, an improved connecting means between each arm and tip member comprising:
   (a) each arm being I shaped in cross section so as to provide a central web and a pair of transverse flanges defining a pair of substantially rectangular cross section sockets on opposite sides of the web,
   (b) each of the tip members having a main body portion with inner and outer toothed work engaging surfaces and a shank comprising a pair of transversely spaced rearwardly extending tongues formed to fit within said sockets in the arm,
   (c) first and second connections aligned along the center line of said tongues and cooperating to fixedly connect said tongues within said sockets of the arms, (d) said first connection comprising an annular cross section sleeve forceably pressed through transverse aligned bored holes in both the arm web and the tip member tongues respectively and a pin forceably pressed through the sleeve, and (e) said second connection being spaced lengthwise of the arm from the first connection and comprising a pin forceably pressed through transverse aligned bored holes in the arm web and the tip member tongues respectively.

2. In a portable spreader-type rescue tool, improved connecting means according to claim 1 in which said first connection is located at the rear of the jaw tip behind the second connection.

3. In a portable spreader-type rescue tool, improved connecting means according to claim 1 in which there is a clevis-receiving opening in the arm behind and separate from the jaw tip member.

4. In a portable spreader-type rescue tool, improved connecting means according to claim 1 in which the force arms are made of aluminum alloy and said jaw tips are made of hardened steel.

* * * * *